March 21, 1944.   F. W. N. DUFFIELD ET AL   2,344,808
CLEVIS JOINT
Filed March 3, 1943
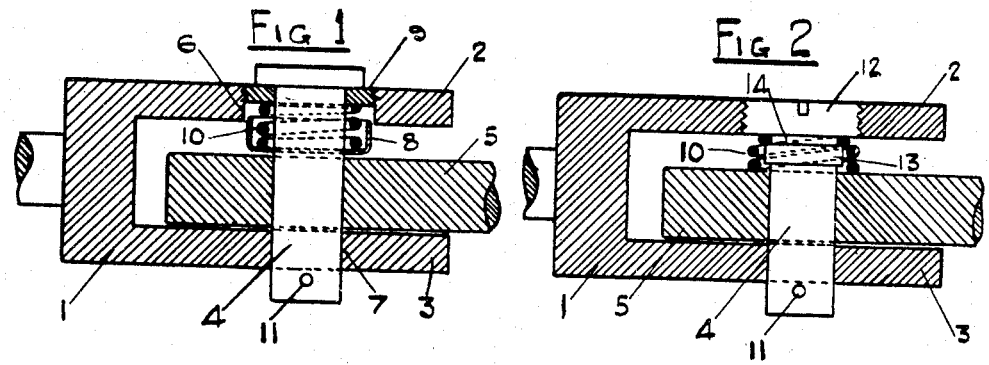
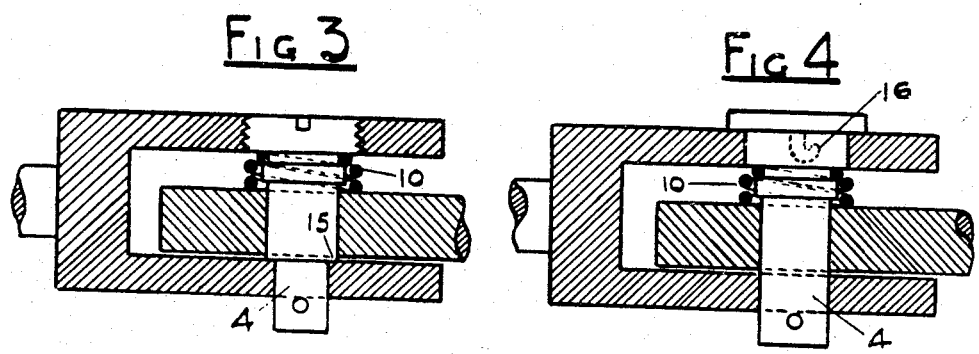
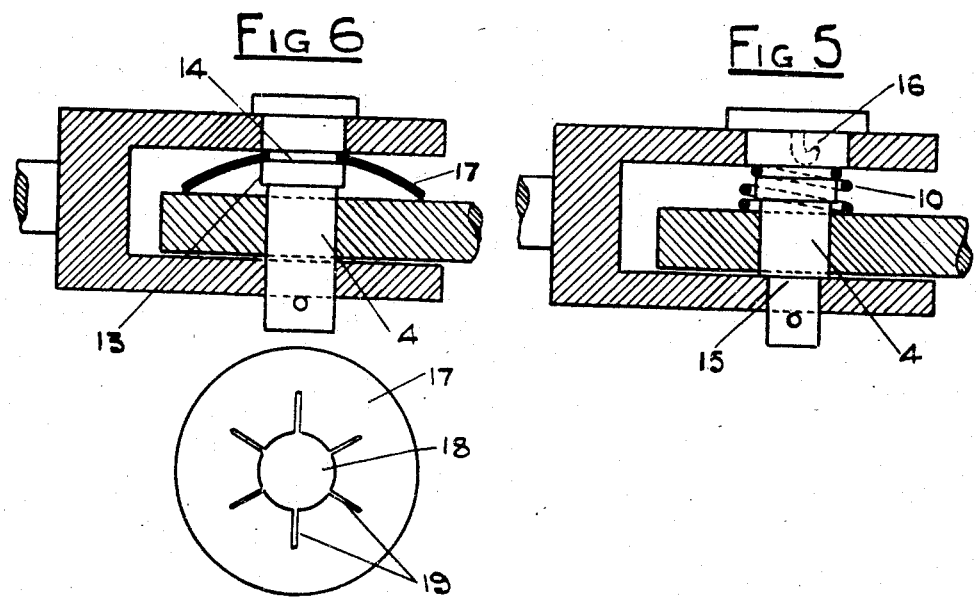
Inventors:
Francis Walker Norman Duffield
Patrick James Hargreaves Riley Patented Mar. 21, 1944

2,344,808

UNITED STATES PATENT OFFICE 2,344,808

CLEVIS JOINT

Francis Walker Norman Duffield, Barr Common, near Walsall, and Patrick James Hargreaves Riley, Birmingham, England Application March 3, 1943, Serial No. 477,884
In Great Britain July 31, 1941

8 Claims. (Cl. 287—100)

This invention has reference to clevis joints such as used in automobile braking systems for uniting two lengths of power-transmitting rodding.

One object of the present invention is to prevent, or reduce to a minimum, the occurrence of rattling by impingement of one member of a clevis joint upon another.

Another object of the invention is to enable any play which may be set up between the various component parts, as a result of wear, to be taken up automatically.

Another object is to facilitate the assembly of a clevis joint.

Another object is to reduce the possibility of the joint making pin being dropped inadvertently during the assembly of a joint or slipping out of the joint after assembly, for instance when a road vehicle is in motion.

Further objects of the invention will be apparent from the following description.

In the accompanying drawing forming a part of this specification and wherein like reference numerals have been employed to designate like parts throughout the several views:

Figure 1 is a side elevation, partly in section, of a clevis joint embodying the present invention, Figs. 2 to 5 inclusive are similar views illustrating alternative or modified forms of the clevis joint shown in Fig. 1, Fig. 6 is a side elevation, partly in section, of a clevis joint of the general type illustrated in the preceding figures but showing the use of a dished metal spring as a substitute for the coil spring shown in Figs. 1 to 5 inclusive, and Fig. 7 is a plan view of the dished metal spring illustrated in Fig. 6.

The joint shown in Figure 1 comprises a bifurcated clevis 1, the two arms or sides 2 and 3 of which are pierced to enable it to receive a pin 4 for coupling the eyed end of a rod 5 to the clevis. The arm or side 2 is drilled and tapped to produce an enlarged screw-threaded aperture 6 concentric with the piercing 7 in the arm 3.

A spring-loaded plunger, consisting of a metal cup 8, is so carried by the arm or side 2 of the clevis that its acts on the end of the rod 5 and thrusts the latter against the arm 3, thus preventing rattle between the rod and clevis.

The plunger forms part of an assembly embodying a plug 9 which is screwed into the aperture 6 and a coil spring 10 located between, and preferably secured at its ends, to the cup and plug. The cup and plug are apertured to permit of the pin being passed through the assembly, to effect the coupling between the clevis 1 and rod 5, and to be secured in position by a cotter pin or the like inserted through a hole 11 in its outer end.

The screw-connection of the plug 9 may be utilised for adjusting the pressure exerted by the spring, but, as such adjustment is not essential since, even in cases of extreme wear, the cup will only be moved a short distance from the clevis arm 2, the outer edge of the aperture 6 may be burred over to prevent the inadvertent removal of the plug by vibration. If desired, grease may be packed between the cup and plug.

The joint between the clevis 1 and rod 5 is effected by connecting the plug and plunger assembly in the aperture 6 and forcing the end of the rod between the cup and clevis arm 3 until the eye therein registers with the piercing 7 in the latter, and the apertures in the plug and cup; the coupling pin may then be passed through both clevis arms in which position it is retained by the cotter or split pin.

In the modified and simplified joint shown in Figure 2, the plug 9 is dispensed with and the head 12 of the pin 4 is screw-threaded to enable it to be engaged with the enlarged aperture in the clevis arm 2. Also the spring 10 is arranged to act directly on the eyed end of the rod 5 instead of through a plunger. The pin head 12 is preferably formed with means, such as a transverse slot, to enable it to be engaged by a tool during assembly.

Thus the number of parts in the joint is reduced to a minimum and costs of production are consequently reduced.

To facilitate assembly, and at the same time reduce the possibility of the spring 10 being mislaid, the pin 4 is provided adjacent its head, with a collar or enlargement 13, thereby producing a peripheral groove or neck 14 between the collar and head. The spring is forced over the said collar so that its end coil engages the groove and retains the spring upon the pin. Preferably the coil at the other end of the spring is in the form of an unbroken ring, the outer surface of which is flattened to provide a smooth face for contacting the rod 5.

The joint is effected simply by inserting the rod 5 between the arms 2 and 3 of the clevis, and passing the pin and spring assembly through the enlarged aperture in the arm 2, the eye in the rod 5 and the piercing in the arm 3. Since the eye and piercing are of substantially the same diameter as the shank of the pin, the spring impinges against the rod and is compressed by the screwing of the head 12 into the enlarged aperture. The pin is preferably retained in position by a pin which is passed through a hole 11 in the end of the said pin.

The joint shown in Figure 3 differs from that shown in Figure 2 only in that the shank of the pin 4 is provided with a shoulder 15 adjacent its outer end, which shoulder is adapted to abut against the clevis arm 3 and serve as a stop for preventing the pin head being screwed too far into the enlarged aperture in the arm 2.

In the joint shown in Figure 4, the pin 4 is formed with a smooth head which is provided with one or more radial pins adapted to engage complementary bayonet slots 16 in the enlarged aperture of the clevis arm 2. Such an arrangement is also shown in Figure 5, which differs from Figure 4 in that a shoulder 15 is provided on the pin shank.

If desired, the spiral spring shown in Figures 1 to 5 may be replaced by a dished metal spring 17 which is formed with a central aperture 18 to enable it to be passed on to the pin 4. A system of radial slits 19 extend from the said aperture so that the spring may be passed over the collar 13 and engage the peripheral groove, or neck 14.

Having described our invention what we claim and desire to secure by Letters Patent is:

1. A clevis joint comprising a bifurcated clevis on the end of one rod, a second rod having an eye in one end thereof, a pin jointing the said eyed end in the clevis and a spring disposed around the pin and stressed between a clevis arm and the eyed end, the said spring being anchored to the said pin.

2. A clevis joint comprising a bifurcated clevis on the end of one rod, a second rod having an eyed end, a headed pin jointing the eyed end in the clevis, a stressed spring around the said pin between one side of the clevis and the said eyed end, the said clevis side having an aperture of sufficient diameter to allow passage of the spring therethrough, the head of said pin closing the said aperture when said headed pin is inserted in the clevis.

3. A clevis joint comprising a bifurcated clevis on the end of one rod, a second rod having an eye in one end, a pin jointing the eyed end in the clevis, the said pin being surrounded by a spring anchored thereto, and embodying a head or plug which normally closes an aperture in one side of the clevis which is of sufficient diameter to permit of the passage therethrough of the spring.

4. A clevis joint comprising a bifurcated clevis on the end of one rod, a second rod having an eye in one end thereof, a pin jointing the eyed end in the clevis, and a stressed spring around the pin and acting on the said eyed end, the said pin having an annular groove adjacent its head, the spring being anchored in the said groove.

5. A clevis joint comprising a bifurcated clevis on the end of one rod, a second rod having an eye in one end thereof, a pin jointing the eyed end in the clevis and a spring around said pin and acting on the said eyed end, the said pin having a head and a portion of enlarged diameter, said enlargement being so located so as to produce an annular groove adjacent the head wherein the spring is anchored.

6. A clevis joint comprising a bifurcated clevis on the end of one rod, a second rod having an eye in one end thereof, a pin jointing the said eyed end in said clevis, and a stressed spring disposed around the pin and acting on the said eyed end, a head on the pin and a radial stud on the said head, one arm of the clevis having an aperture for receiving the pin head and the wall of the aperture having a bayonet slot for receiving the stud so as to lock the pin in the clevis.

7. A clevis joint comprising a bifurcated clevis on the end of one rod, one side of said clevis having a tapped aperture therein, a second rod having an eye on one end, a pin jointing the eyed end in the clevis, and a stressed spring around the pin and between the apertured side of the clevis and said eyed end, said pin having a head provided with peripheral threads adapted to engage said tapped aperture in said one side of the clevis.

8. A clevis joint comprising a bifurcated clevis on the end of one rod, a second rod having an eye in one end, a pin jointing the eyed end in the clevis, and a spring surrounding said pin and anchored thereto and acting on said eyed end, said pin having a head engaging one side of the clevis and having a peripheral shoulder adjacents its end remote from the said head for engaging the other side of the clevis to limit the longitudinal movement of the pin in the clevis.

FRANCIS WALKER NORMAN DUFFIELD.
PATRICK JAMES HARGREAVES RILEY.